(12) United States Patent
Schleicher et al.

(10) Patent No.: US 12,364,193 B2
(45) Date of Patent: Jul. 22, 2025

(54) ROW SENSE OPERATIONS WITH CONTEXT SENSING

(71) Applicant: Deere & Company, Moline, IL (US)

(72) Inventors: Tyler D. Schleicher, Ankeny, IA (US); Curtis A. Maeder, Johnston, IA (US); Hichem Bouguerra, Johnston, IA (US)

(73) Assignee: Deere & Company, Moline, IL (US)

( * ) Notice: Subject to any disclaimer, the term of this patent is extended or adjusted under 35 U.S.C. 154(b) by 87 days.

(21) Appl. No.: 17/341,947

(22) Filed: Jun. 8, 2021

(65) Prior Publication Data
US 2022/0386527 A1    Dec. 8, 2022

(51) Int. Cl.
*A01D 41/127* (2006.01)
*A01D 47/00* (2006.01)
*G05D 1/00* (2024.01)

(52) U.S. Cl.
CPC ......... *A01D 41/1278* (2013.01); *A01D 47/00* (2013.01); *G05D 1/0227* (2013.01); *G05D 1/0274* (2013.01)

(58) Field of Classification Search
CPC .. A01D 41/1278; A01D 47/00; G05D 1/0227; G05D 1/0274; G05D 2201/0201; A01B 69/00
See application file for complete search history.

(56) References Cited

U.S. PATENT DOCUMENTS

| | | | |
|---|---|---|---|
| 6,336,051 B1* | 1/2002 | Pangels | A01B 79/005 700/207 |
| 7,716,905 B2 | 5/2010 | Wilcox et al. | |
| 8,655,536 B2 | 2/2014 | Peake et al. | |
| 9,936,637 B2 | 4/2018 | Anderson et al. | |
| 2006/0162631 A1* | 7/2006 | Hickey | A01D 41/127 111/200 |
| 2011/0196565 A1* | 8/2011 | Collins | G05D 1/0219 701/25 |
| 2014/0129073 A1* | 5/2014 | Ferguson | B60W 30/18163 701/23 |
| 2017/0015416 A1* | 1/2017 | O'Connor | A01M 7/0089 |

(Continued)

FOREIGN PATENT DOCUMENTS

| | | |
|---|---|---|
| DE | 102016219372 A1 | 5/2017 |
| DE | 102016219373 A1 | 5/2017 |
| WO | WO-2021214580 A1 * 10/2021 | ............. A01D 57/26 |

OTHER PUBLICATIONS

German Search Report issued in application No. DE102022203349.3 dated Feb. 7, 2023 (08 pages).

*Primary Examiner* — Scott A Browne
*Assistant Examiner* — Shahira Baajour
(74) *Attorney, Agent, or Firm* — Christopher J. Volkmann; KELLY, HOLT & CHRISTENSON, P.L.L.C.

(57) ABSTRACT

A computer-implemented method of operating an agricultural work machine is provided. The method includes initiating row sensing guidance for the agricultural work machine to guide steering of the agricultural work machine based at least one signal from a row sensor; obtaining contextual information; determining whether a row is present based on the contextual information; and selectively ignoring the at least one signal from the row sensor based on whether a row is present. An agricultural work machine and a control system for an agricultural work machine are also provided.

19 Claims, 11 Drawing Sheets

(56) References Cited

U.S. PATENT DOCUMENTS

| | | | |
|---|---|---|---|
| 2017/0238258 A1* | 8/2017 | Ramalho de Oliveira | ................. |
| | | | H04W 52/0261 |
| | | | 455/574 |
| 2018/0317372 A1* | 11/2018 | Schleicher | ........... A01B 79/005 |
| 2020/0230633 A1* | 7/2020 | Serrat | .................... G06V 20/56 |
| 2021/0294932 A1* | 9/2021 | Venu | ....................... G06F 30/12 |
| 2022/0350344 A1* | 11/2022 | Horstmann | .......... G05D 1/0212 |

* cited by examiner

ROW SENSE OPERATIONS WITH CONTEXT SENSING

FIELD OF THE DESCRIPTION

The present description relates to agricultural work machines. More particularly, the present description relates to agricultural work machines for row crop operations.

BACKGROUND

There are a wide variety of different types of agricultural work machines. Some agricultural work machines include tractors, sprayers, and harvesters, such as combine harvesters, sugar cane harvesters, and corn harvesters.

Agricultural work machines used for row crop operations are able to sense rows and/or individual crop plants in the rows and automatically steer the agricultural work machine to follow the row and/or position the agricultural work machine for efficient operation on the rows.

The discussion above is merely provided for general background information and is not intended to be used as an aid in determining the scope of the claimed subject matter.

SUMMARY

A computer-implemented method of operating an agricultural work machine is provided. The method includes initiating row sensing guidance for the agricultural work machine to guide steering of the agricultural work machine based at least one signal from a row sensor; obtaining contextual information; determining whether a row is present based on the contextual information; and selectively ignoring the at least one signal from the row sensor based on whether a row is present. An agricultural work machine and a control system for an agricultural work machine are also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

DETAILED DESCRIPTION

Figure 1:
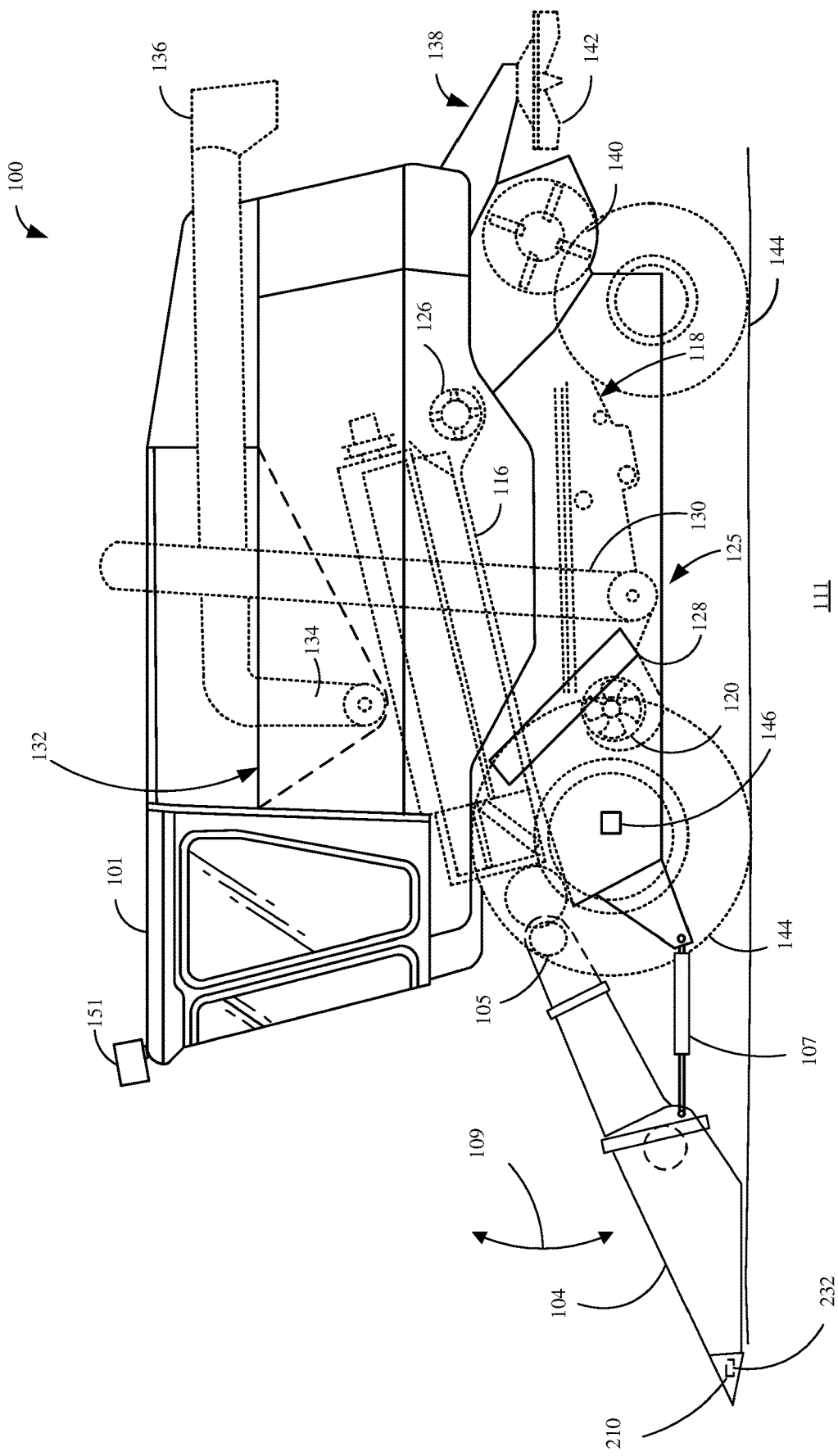
FIG. 1 is a diagrammatic view of one particular agricultural work machine in which embodiments described herein are particularly useful.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

While embodiments are applicable to any agricultural work machine that is used for row crop operations, the present description will be provided with respect to an agricultural harvester. Some agricultural harvesters are specifically configured for operation with row crops, such as corn, peanuts, cotton, rice, sugarcane, wheat, barley, along with soybeans, and hay. These agricultural harvesters may include one or more sensors that sense plants as they encounter the harvester. Using these sensors, a control system of the agricultural harvester can adjust steering to ensure that the harvester is aligned with the row as the agricultural harvester moves through the field. However, the sensors used for such harvesters are typically tactile-based in that they provide an electrical parameter (voltage, resistance, etc.) that reacts to the plant physically striking the sensor. As such, these sensors are not able to discriminate between crop plants and weeds or grass. Thus, if the harvester should enter a drainage area with no crops, but with grass stalks that impinge the sensors, the automatic steering could react undesirably. For example, the harvester may attempt to "follow" a non-existent row and resist manual steering around a pool of water in the drainage area.

In accordance with various embodiments described below, a system and method are provided for employing one or more contextual inputs to a control system of the agricultural harvester to automatically determine when to ignore row sensing data and/or switch to a manual steering mode.

FIG. 1 is a diagrammatic view of one particular agricultural work machine in which embodiments described herein are particularly useful. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, and other agricultural work machines. Consequently, the present disclosure is intended to encompass the various types of harvesters described and is, thus, not limited to combine harvesters.

As shown in FIG. 1, agricultural harvester 100 illustratively includes an operator compartment 101, which can have a variety of different operator interface mechanisms, for controlling agricultural harvester 100. Agricultural harvester 100 includes front-end equipment, such as a row crop harvesting head 104. Agricultural harvester 100 also includes a material handling subsystem 125.

Row crop harvesting head 104 is pivotally coupled to the frame of agricultural harvester 100 along pivot axis 105. One or more actuators 107 drive movement of row crop harvesting head 104 about axis 105 in the direction generally indicated by arrow 109. Thus, a vertical position of row crop harvesting head 104 above ground 111 over which row crop harvesting head 104 travels is controllable by actuating actuator 107. While not shown in FIG. 1, agricultural harvester 100 may also include one or more actuators that operate to apply a tilt angle, a roll angle, or both to row crop harvesting head 104 or portions thereof.

Agricultural harvester 100 also includes a separator 116 as well as a cleaning subsystem or cleaning shoe (collectively referred to as cleaning subsystem 118). The material handling subsystem 125 also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for row crop harvesting head 104. For example, the operator inputs a setting or settings to a control system, described in more detail below, that controls actuator 107. The control system may also receive a setting from the operator for establishing the tilt angle and roll angle of row crop harvesting head 104 and implement the inputted settings by controlling associated actuators, not shown, that operate to change the tilt angle and roll angle of row crop harvesting head 104. The actuator 107 maintains row crop harvesting head 104 at a height above ground 111 based on a height setting and, where applicable, at desired tilt and roll angles. Each of the height, roll, and tilt settings may be implemented independently of the others. The control system responds to error (e.g., the difference between the height setting and measured height of row crop harvesting head 104 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

FIG. 1 also shows that, in one example, agricultural harvester 100 includes machine speed sensor 146 and a forward-looking image capture mechanism 151, which may be in the form of a stereo or mono camera. Machine speed sensor 146 senses the travel speed of agricultural harvester 100 over the ground. Machine speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a positioning system, such as a global positioning system (GPS), a dead reckoning system, a long range navigation (LORAN) system, or a wide variety of other systems or sensors that provide an indication of travel speed.

Figure 2:
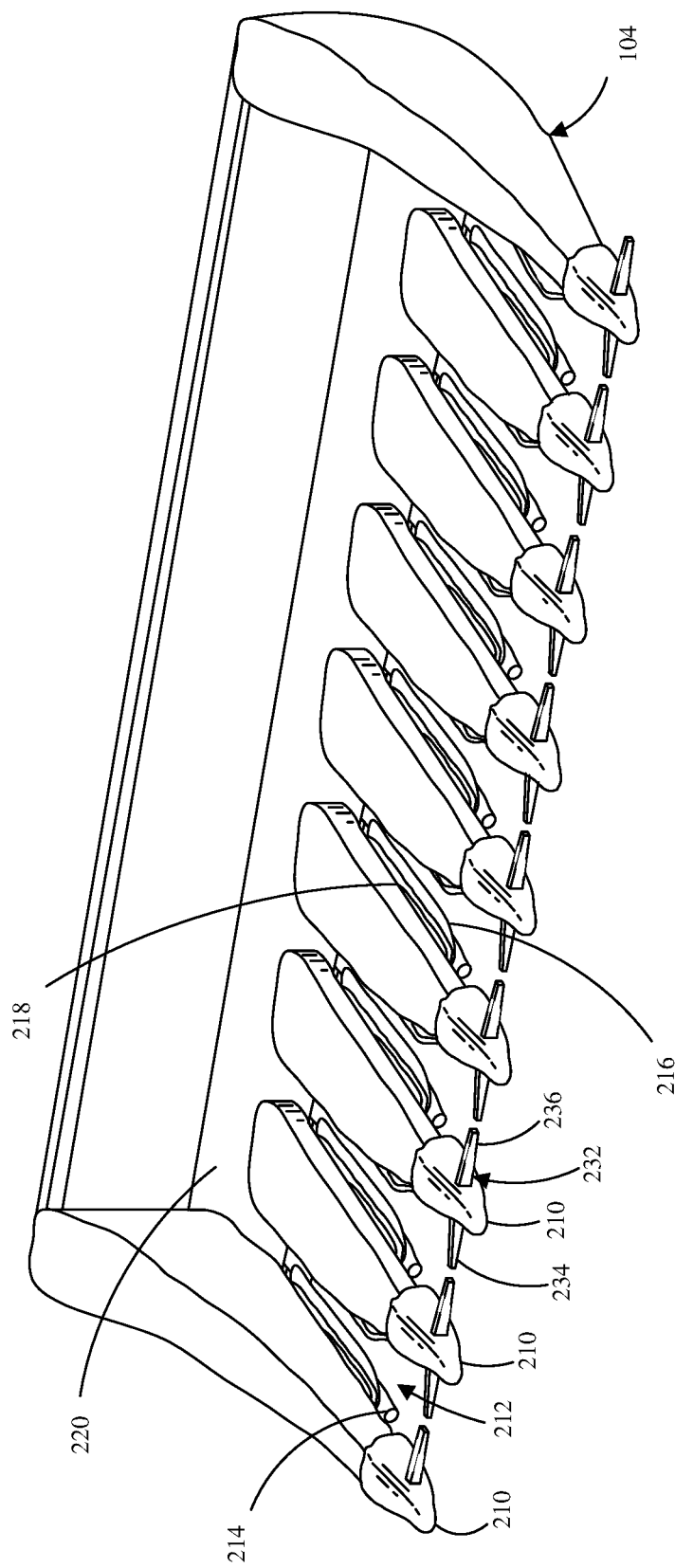
FIG. 2 is a diagrammatic perspective view of a row crop harvesting head.

Referring to FIGS. 1 and 2, as agricultural harvester 100 travels through a field harvesting rows crops, individual crop plants pass between crop dividers 210 and then further rearward in row units 212. Each row unit 212 includes a pair of stalk rollers 214 that engage opposite sides of the plant stalk and pull the stalks downward. Stripping plates 216 are disposed above the stalk rollers 214 on each side such that as the stalk rolls 214 pull the stalk downward, ears of corn extending from the stalk of the crop plant impact the stripping plates 216, causing the ears of corn to be broken from the stalk of the plant. The stripped ears tumble upon stripping plates 216 and are carried rearwardly by gathering chains 218 into trough 220 where they are moved by an auger or other suitable drive (not shown) into a feederhouse that carries the ears of corn into the body of the harvester for further processing in accordance with known techniques.

As shown in FIG. 2, row crop harvesting head 104 includes a one or more vehicle guidance sensors 232 that are each affixed to a forward end of crop dividers 210 on row crop harvesting head 104. In the illustrated example, each vehicle guidance sensor 232 includes a pair of feelers 234, 236 that extend outwardly from each side of crop divider 210. As the harvester moves through the field harvesting row crops, the plant stalks push against feelers 234, 236 and deflect rearwardly. This rearward deflection causes the sensor 232 to provide a signal indicative of the relative location of the plant stalk with respect to crop dividers 210. While the present example has been described with respect to vehicle guidance sensor 232 having a pair of feelers 234, 236 extending from opposite sides of a crop divider, embodiments are practicable with row sensors formed of a pair of feelers extending inwardly from a pair of adjacent crop dividers. Further, embodiments described below are applicable to row crop sensing using any form of plant stalk sensor now known or later developed.

Figure 3:
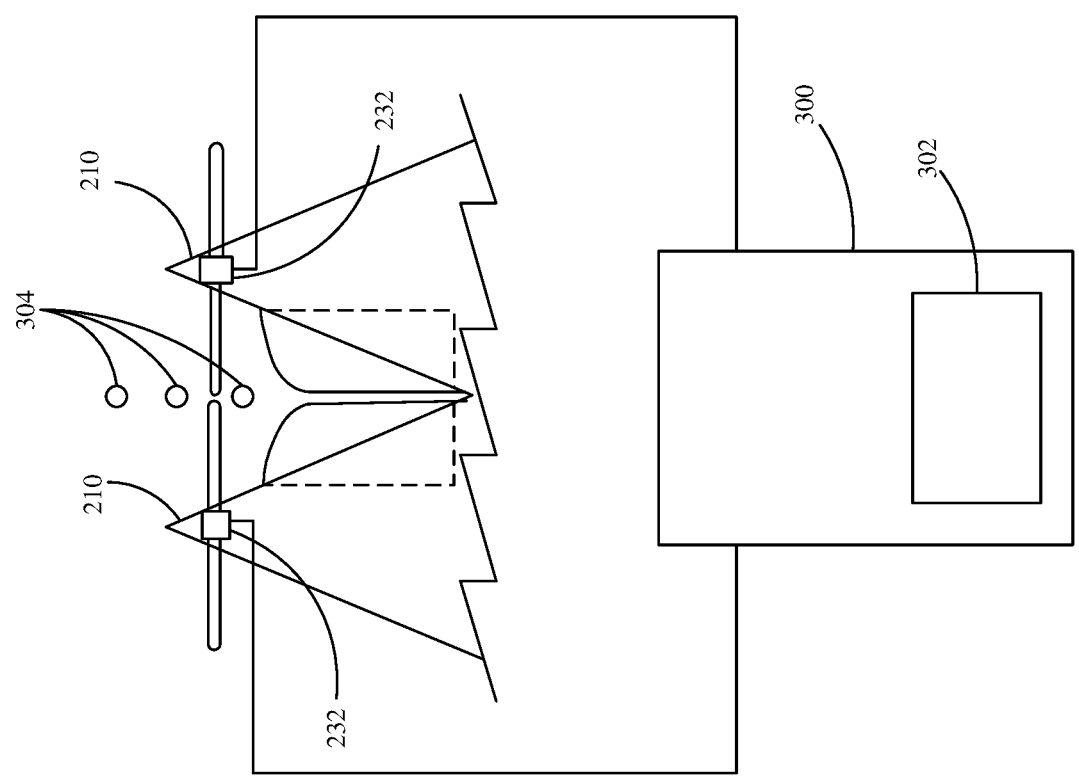
FIG. 3 is a diagrammatic view of a portion of a row crop harvesting head and steering control system.

FIG. 3 is a diagrammatic view of a portion of a row crop harvesting head and control system. Control system 300 includes or is coupled to vehicle steering system 302 such that command signals from control system 300 cause vehicle steering system 302 to affect vehicle direction. Control system 300 is coupled to guidance sensors 232 and receives an indication of deflection of various feelers as the plants 304 of the row crop impact the feelers as the machine moves through a field. Vehicle steering system includes any variety of known components to generate physical outputs based on the command signal from control system 300. For example, vehicle steering system 304 may comprise a valve and steering actuator (not shown) where the valve is driven by the command signal and controls the flow of hydraulic fluid to and from the steering actuator. The steering actuator is then coupled to the rear wheels of the harvester to steer the harvester.

Control system 300 is configured, through hardware, software, or a combination thereof, to receive signals from the vehicle guidance sensors 232 and to calculate a steering signal at least from the signals of the vehicle guidance sensor(s) 232 and to responsively control the steering actuator to steer the harvester in order to center the crop plants 304 between adjacent crop dividers.

Figure 4:
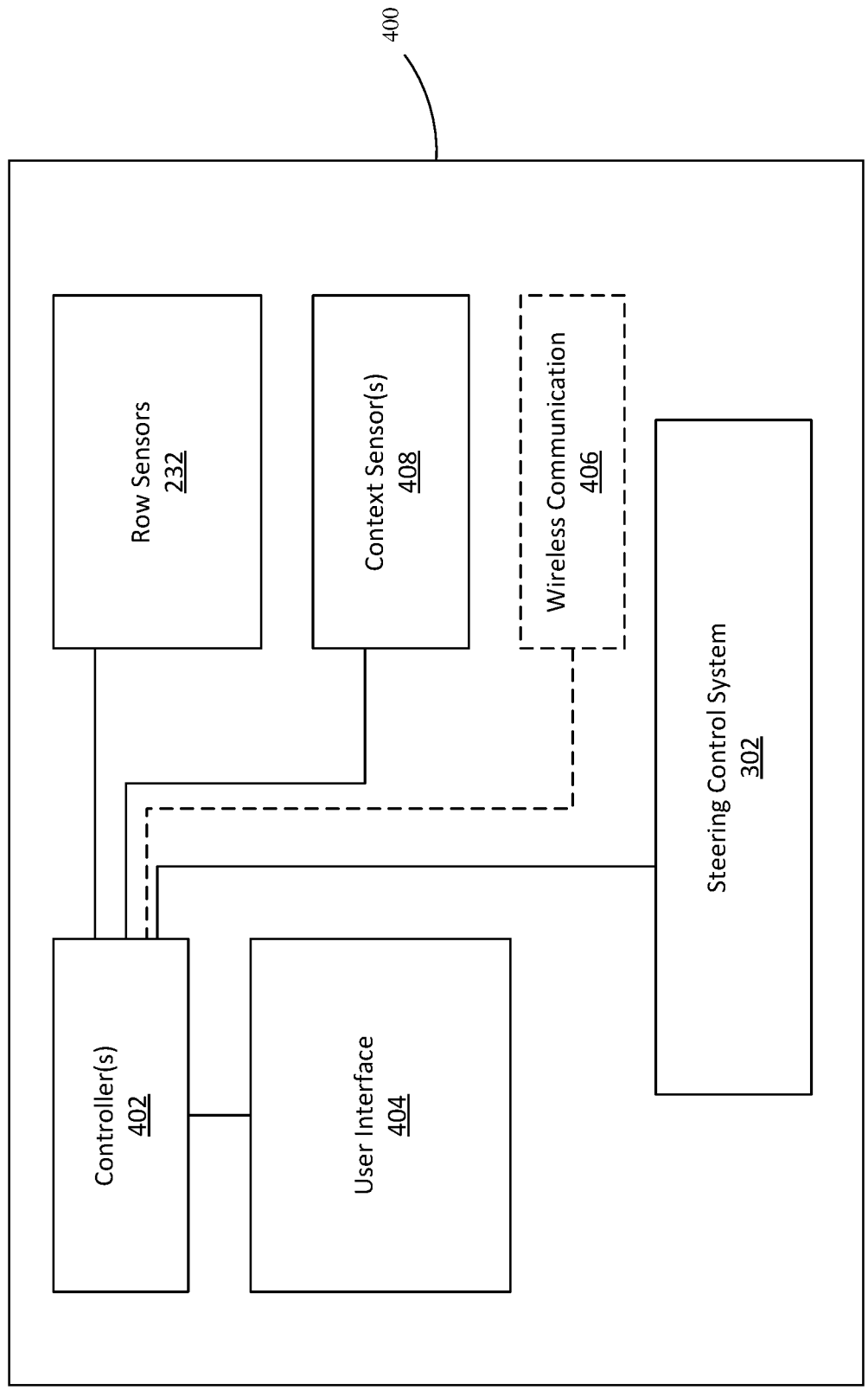
FIG. 4 is a block diagram of a control system of an agricultural work machine in accordance with one embodiment.

FIG. 4 is a block diagram of a control system, or a portion thereof, of an agricultural machine in accordance with one embodiment. Control system 400 includes one or more controllers 402 that are configured to provide control functions relative to the agricultural machine. In one example, controller 402 is a microprocessor that executes a number of instructions to provide one or more control outputs, such as steering angle. Control system 400 includes or is coupled to steering control system 302 such that control commands or signals sent from controller 402 cause steering control system 302 to steer the harvester. Controller 402 is also coupled to one or more row sensor(s) 232 that provides an electrical signal in response to plants impinging feelers or other suitable structures of the row sensor 232. Accordingly, controller 402 receives signals from row sensors 232 and calculates or otherwise determines a steering angle output to steer the harvester such that the plants of the row crop are equidistant between adjacent dividers in the crop row harvesting head as the harvester moves about the field.

Controller 400 is also coupled to one or more user interface mechanisms 404. The operator interacts with operator interface mechanisms 404. In some examples, operator interface mechanisms 404 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, the operator may interact with operator interface mechanisms 404 using touch gestures. These examples described above are provided as illustrative examples and are not intended to limit the scope of the present disclosure. Consequently, other types of operator interface mechanisms 404 may be used and are within the scope of the present disclosure.

Controller 402 may also be coupled to an optional wireless communication module 406, which allows controller 402 to communicate wirelessly, preferably bidirectionally, with one or more remote devices. Examples of suitable wireless communication include, without limitation, Bluetooth (such as Bluetooth Specification 2.1 rated at Power Class 2); a Wi-Fi specification (such as IEEE 802.11.a/b/g/n); an RFID specification; cellular communication techniques (such as GPRS/GSM/CDMA); WiMAX (IEEE 802.16), and/or satellite communication.

In accordance with various embodiments described herein, controller 402 is coupled to one or more context sensors 408. Controller 402 receives the signal(s) from context sensor(s) 408 and processes the signal(s) to determine whether to ignore the signals from row sensor(s) 232 thereby requiring the operator to assume manual steering control. This provides the ability to selectively determine when the signals from the row sensors are not to be used or trusted, Examples of such times include, without limitation; when the harvester is to execute a situational maneuver such as an end turn; when the harvester enters a non-planted area; when the harvester enters an area that has already been harvested; when the harvester enters an area where the crop plants have not grown sufficiently to engage the feelers of the row sensors. Thus, a context sensor is any sensor or system that provides information relevant to any of these conditions. Further, as will be described below, context sensing may include combining sensor information from one or more different context sensors or systems in order to determine when to ignore the row sensor information and require manual steering.

Figure 5:
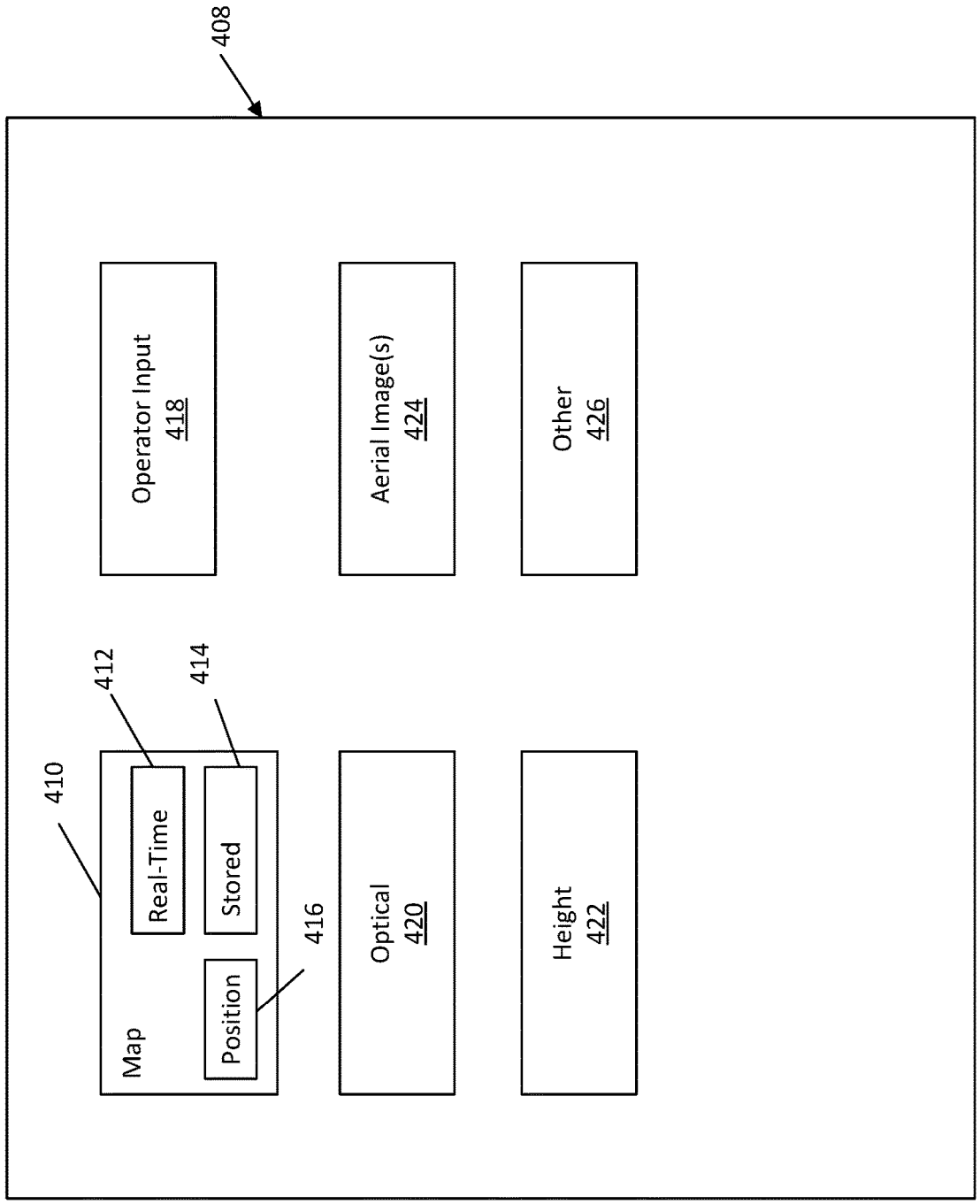
FIG. 5 is a block diagram of one or more sensors or systems that may comprise context sensor(s) in accordance with various examples described below.

FIG. 5 is a block diagram of one or more sensors or systems that may comprise context sensor(s) 408. A first exemplary system employs a map, as indicated at reference numeral 410. This map provides a geographical indication of where row crops exist and where they do not. Thus, the map-based embodiment employs a position sensor 416 to obtain the current position of the agricultural machine and determine, using the map, whether row crops exist at the current position. If such row crops do not exist, then the context sensor 408 provides such indication to controller 402 (shown in FIG. 4) such that controller 402 can ignore signals from the row sensor(s) 232. Position sensor 416 may be any suitable sensor that provides an indication relative to the geographical position of the agricultural machine. Position sensor 416 can include, but is not limited to, a global navigation satellite system (GNSS) receiver that receives signals from a GNSS satellite transmitter. Position sensor 416 can also include a real-time kinematic (RTK) component that is configured to enhance the precision of position data derived from the GNSS signal. Position sensor 416 can include a dead reckoning system, a cellular triangulation system, or any of a variety of other geographic position sensors.

Map 410 may be downloaded onto agricultural harvester 100 and stored in a data store, using communication system 406 as indicated at block 414, or in other ways. In some examples, communication system 406 may also include a system that facilitates downloads or transfers of information to and from a secure digital (SD) card or a universal serial bus (USB) card or both. Additionally, or alternatively, map 410 may be interacted with in real-time, as indicated at block 412, using communication system 406 and position sensor 416. In such instance, controller 402 receives an indication of geographic position from position sensor 416 and queries a remote server hosting the map to determine whether the current position has row crops. If the remote server responds that the current position does not have row crops, then controller 402 will ignore row sensors 232 and require manual steering control.

Map 410 may define geographical regions where no crops are to be expected, such as a grass area, an already-harvested area, or a weedy area. The map 410 may also define or show geographical regions where crop rows are expected. For example, map 410, or a portion thereof, may be created by the planter during planting. Thus, map 410 may precisely indicate where rows are planted. Additionally, or alternatively, map 410 may include geographical boundaries or regions showing field edges and/or waterways. Additionally, or alternatively, map 410 may include a specified boundary turning area. Accordingly, when the agricultural machine enters the specified boundary turning area (determined using the map 410 and an indication of geographic position from position sensor 416), controller 402 can automatically ignore row sensor data and instead switch to another steering source (such as GPS-based guidance around a turn). Further, map 410 may be updated dynamically as the agricultural machine operates to indicate that portions of the field have been operated upon (e.g. harvested).

Context sensor 408 may also comprise one or more optical sensors or cameras as indicated at block 420. Such optical sensors may include forward-looking camera 151 (shown in FIG. 1). When a camera is employed as an optical sensor, the image data from the camera is preferably provided to an image processing module (such as OpenCV) to identify rows as the agricultural machine moves over the field. Then, when such image processing module determines that the image has transitioned from a row present state to a row not present state, the optical-based context sensor 408 provides an indication of such to controller 402 such that controller 402 may ignore signals from row sensors 232. While the optical sensor has been described with respect to one or more cameras, it is expressly contemplated that other optical techniques, such as LIDAR can also be used.

Context sensor 408 may also comprise a crop height sensor, as indicated at block 422. This sensor may be, for example, an ultrasonic sensor, that is mounted to the agricultural machine and directs ultrasonic energy downwardly to the crop plants and detects a response. When the presence of rows in the field changes, the height sensor may detect a difference in the response signal. This change can be provided to controller 402 as an indication of a transition to a row-not-present state.

Context sensor 408 may also include certain operator inputs 418 indicative of a situational maneuver. For example, an operator may initiate an end turn of the harvester or a three-point turn. Upon detecting these operator inputs, context sensor 408 may provide a signal to controller 402 such that controller 402 will ignore signals from row sensors 232, as the operator has begun a manual steering operation.

Context sensor 408 may also comprise one or more aerial images 424 of the field being worked. These aerial images may be provided as data that is geo-referenced and used with a suitable position sensor, such as position sensor 416. Thus, as the harvester enters an area of the field where the aerial image indicates that the row is no longer living, the context sensor 408 can provide an indication of such to controller 402. Similarly, in one example, the aerial image may be provided by an unmanned aerial vehicle with a camera directed in front of the harvester.

Context sensor 408 may also comprise other types of sensors as indicated at block 426. Such other sensors whether now known or later developed provide information relevant to the presence of rows in the field at the position of the agricultural machine as the agricultural machine moves through the field. Additionally, while various types of context sensors have been described, it is expressly contemplated that combinations of the various types of sensors can be used in accordance with various embodiments. Further, while the sensor signals themselves are described as providing the context, it is also expressly contemplated that the context sensor may include some form of processing of the signals. Such processing can include filtering, thresholding, and/or statistically processing the signals.

Figure 6:
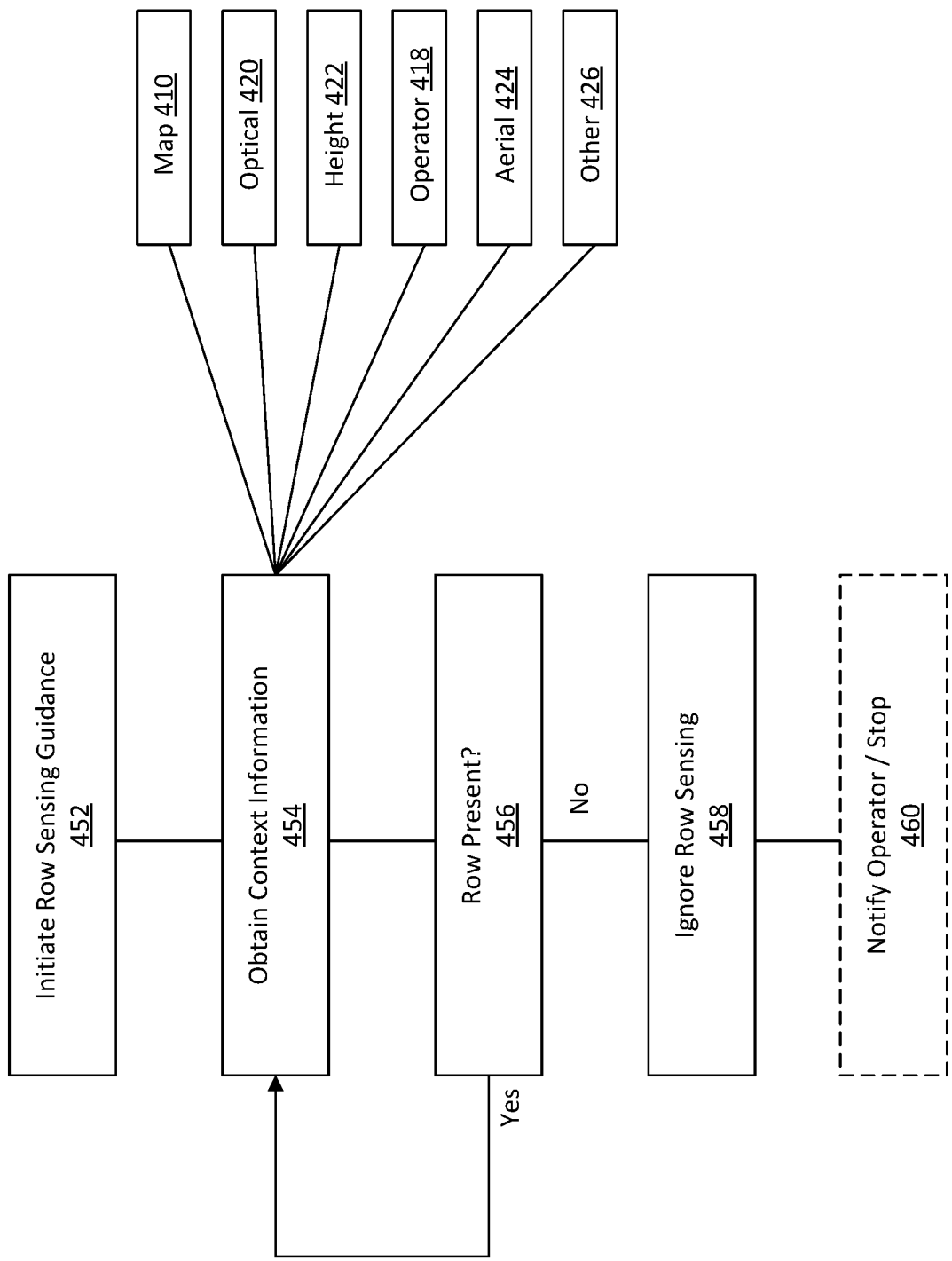
FIG. 6 is a flow diagram of a method of operating an agricultural work machine in a row operation in accordance with one embodiment.

FIG. 6 is a flow diagram of a method of operating an agricultural machine in a row operation in accordance with one embodiment. Method 450 begins at block 452 where row sensing guidance is initiated. Once row sensing guidance has been initiated, control passes to block 454 where context information is acquired. This context information may be provided by one ore or more context sensors or combinations thereof. As indicated in FIG. 6, such context information may be provided from a map-based context sensor 410, an optical system 420, a height sensor 422, operator input 418, aerial image 424, or other type of sensor 426. When the context information is obtained, controller 402 determines whether a row is present based on the context information. This determination may be as simple as receiving a Boolean indication from the context sensor indicating a state of row present vs. row not present. Additionally, or alternatively, controller 402 may combine one or more context sensor signals and/or provide additional processing to determine a row present probability. This probability can be compared to a threshold, such as 10%, to determine whether a row is present. If a row is present, control returns to block 454 where additional context information is acquired as the method iterates. However, if controller 402 determines that a row is not present, then control passes to block 458 where controller 402 will begin ignoring row sensor data. This may mean guiding the steering using only GPS and a map-based guidance system. However, optionally, method 450 may further transition to optional block 460 where controller 402 notifies the operator that the row-based steering guidance has ended and that the operator should assume manual steering control. Further, optional block 450 may also simply stop the agricultural machine in the field.

The present discussion has mentioned processors and servers. In some examples, the processors and servers include computer processors with associated memory and timing circuitry, not separately shown. The processors and servers are functional parts of the systems or devices to which the processors and servers belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, the user actuatable operator interface mechanisms can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, and interactions. It will be appreciated that any or all of such systems, components, logic and interactions may be implemented by hardware items, such as processors, memory, or other processing components, including but not limited to artificial intelligence components, such as neural networks, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 7:
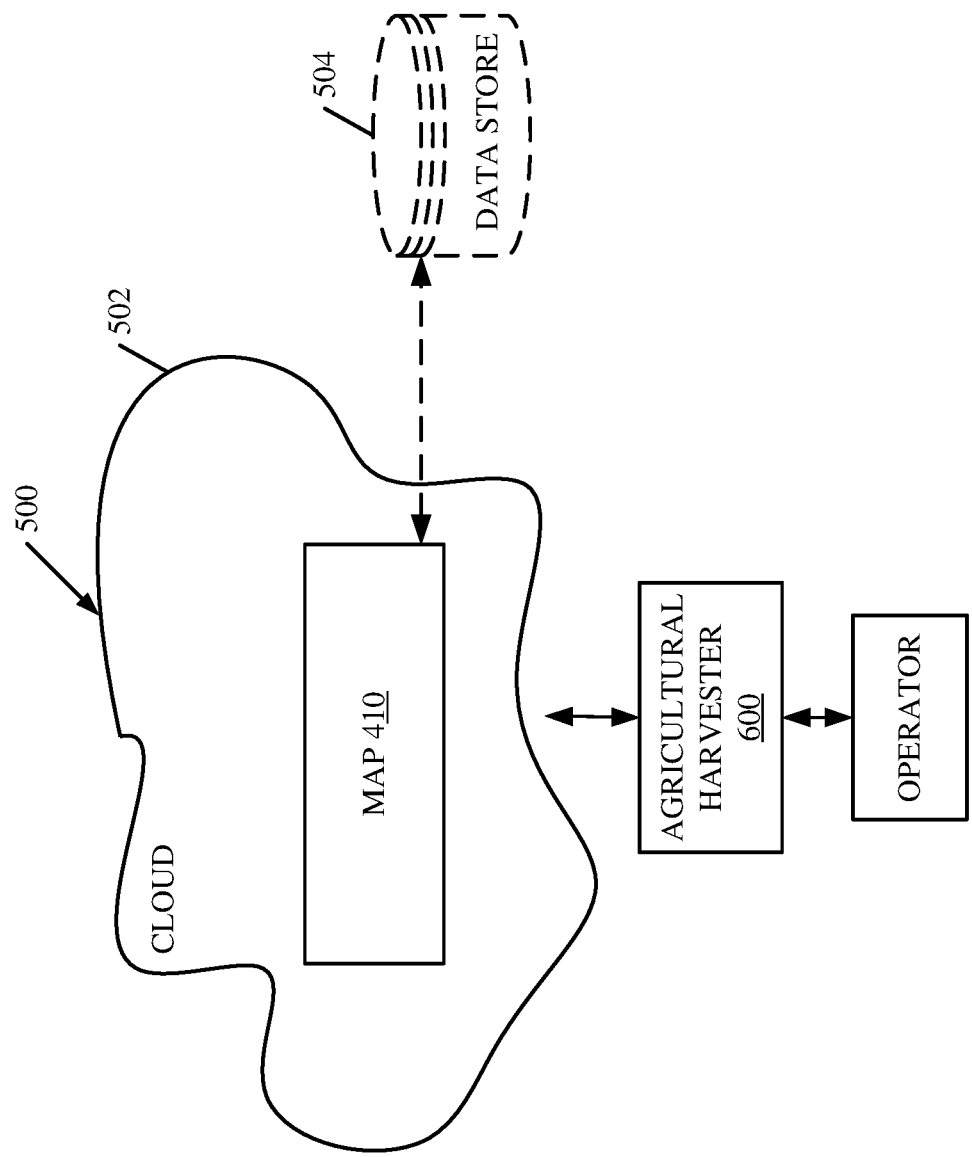
FIG. 7 is a block diagram showing one example of an agricultural harvester in communication with a remote server environment.

FIG. 7 is a block diagram of agricultural harvester 600, which may be similar to agricultural harvester 100 shown in FIG. 1. The agricultural harvester 600 communicates with elements in a remote server architecture 500 using a wireless communication module, such as module 406 (shown in FIG. 4). In some examples, remote server architecture 500 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 4 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

The example shown in FIG. 7 illustrates that map 410 may be located at a server location 502 that is remote from the agricultural harvester 600. Therefore, in the example shown in FIG. 7, agricultural harvester 600 accesses systems through remote server location 502. FIG. 7 also shows that some elements may be disposed at a remote server location 502 while others may be located elsewhere. By way of example, data store 504 may be disposed at a location separate from location 502 and accessed via the remote server at location 502. Regardless of where the elements are located, the elements can be accessed directly by agricultural harvester 600 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated, or manual information collection system. As the combine harvester 600 comes close to the machine containing the information collection system, such as a fuel truck prior to fueling, the information collection system collects the information from the combine harvester 600 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the agricultural harvester 600 until the agricultural harvester 600 enters an area having wireless communication coverage. The agricultural harvester 600, itself, may send the information to another network.

It will also be noted that the elements of FIG. 4, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 500 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 8:
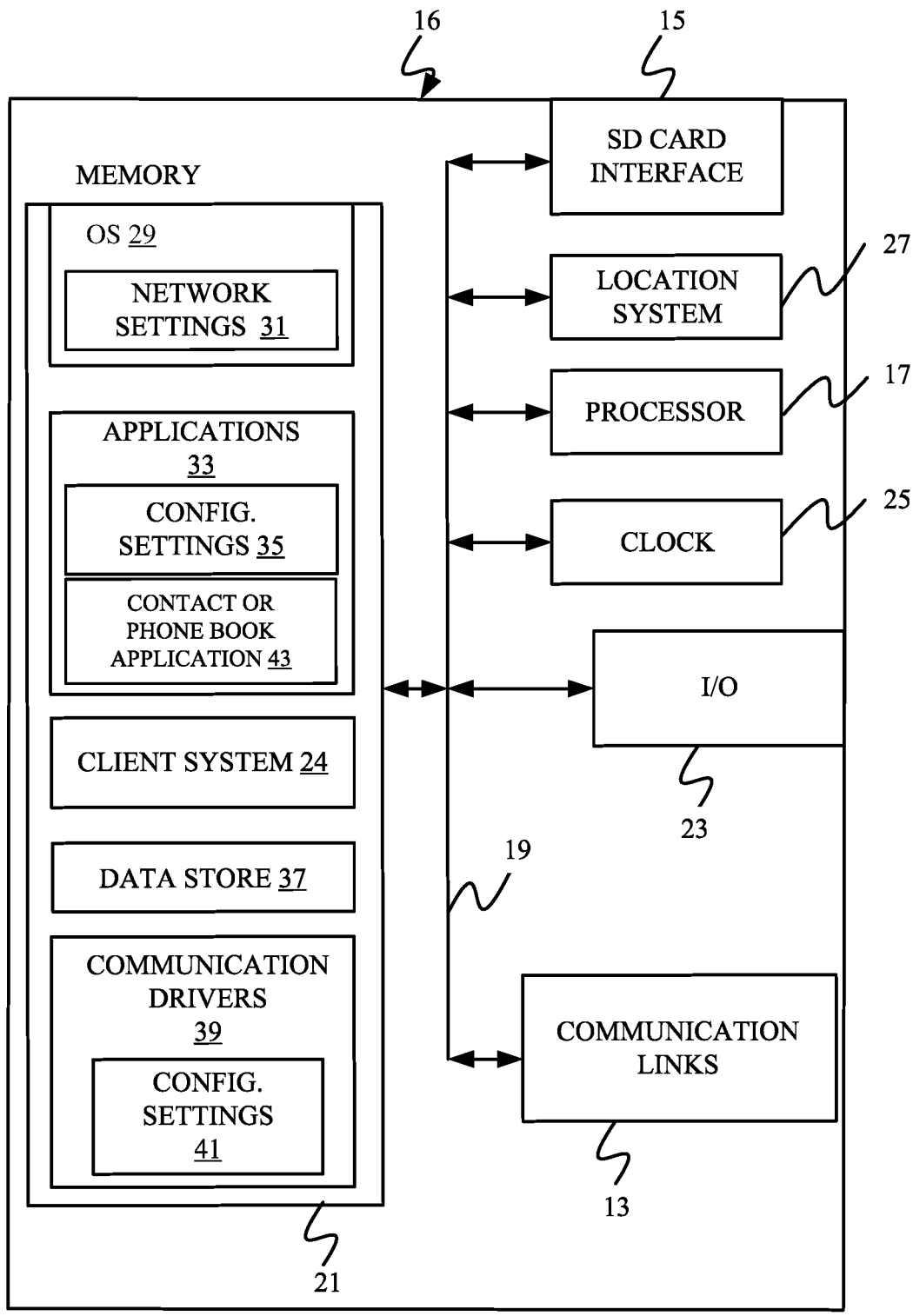
FIGS. 8-10 show examples of mobile devices that can be used in an agricultural harvester.
Figure 9:
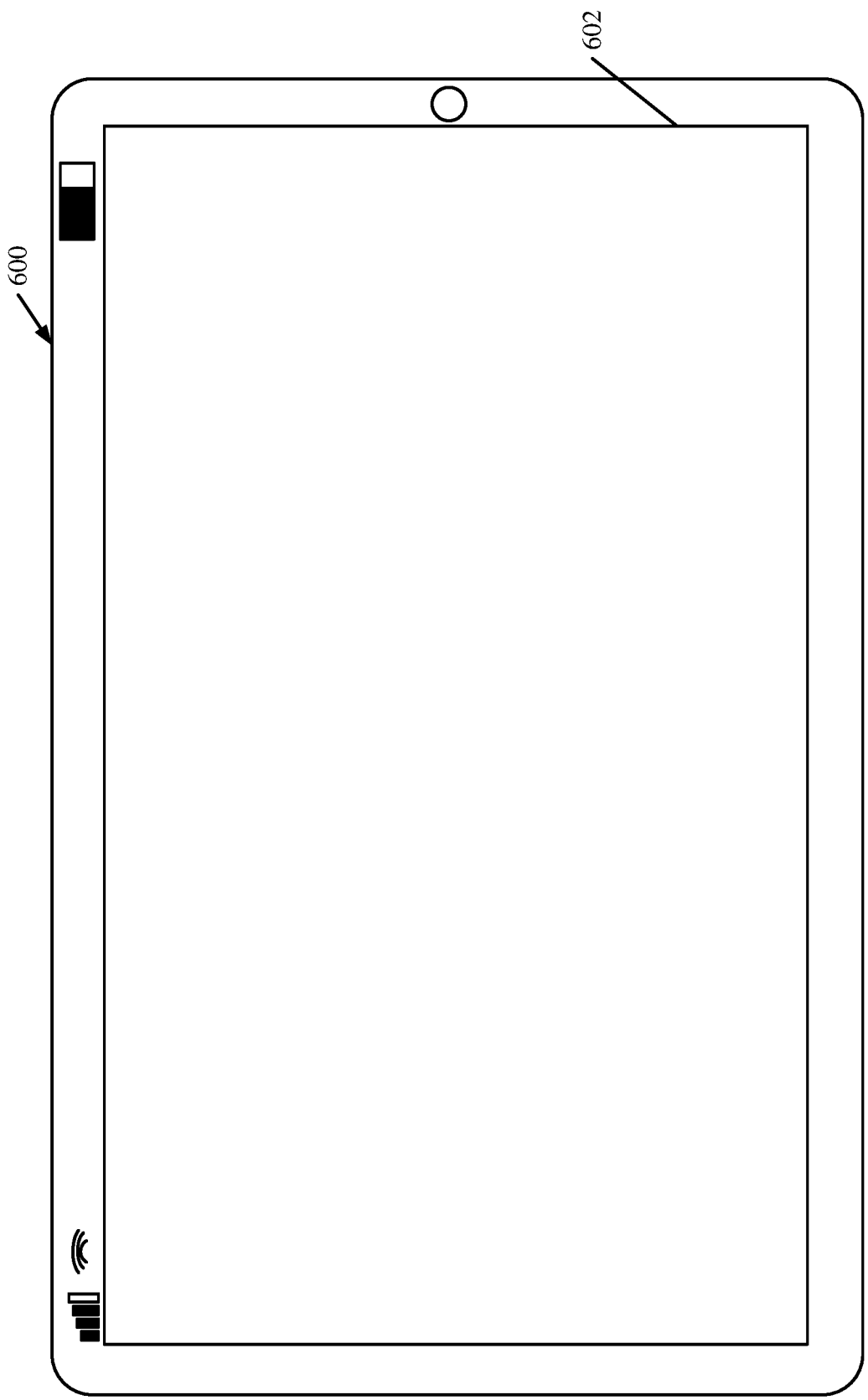
Figure 10:
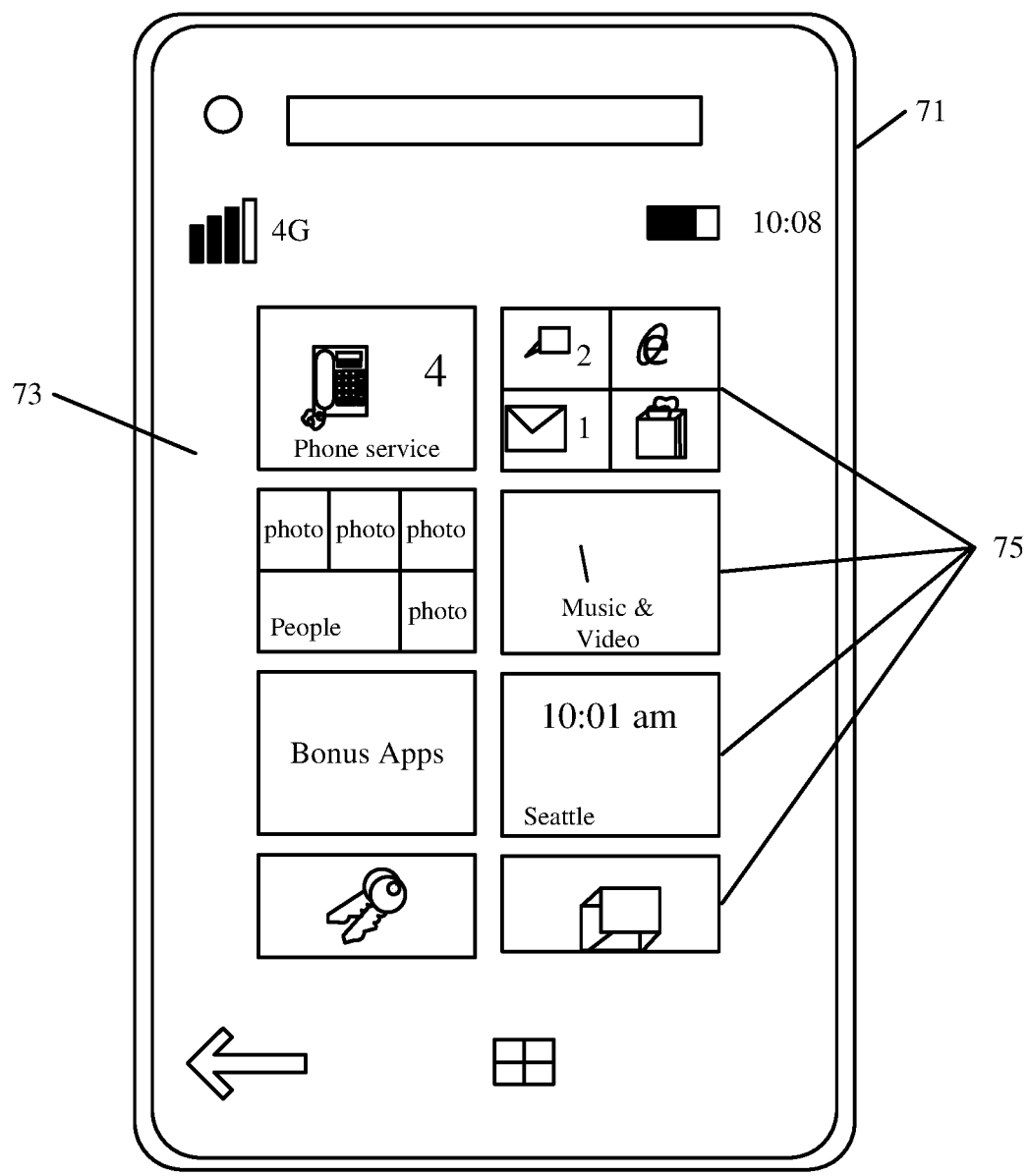

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use as part of the user interface 404. FIGS. 9-10 are examples of handheld or mobile devices.

FIG. 8 provides a general block diagram of the components of a client device 16 that can run some components shown in FIG. 4, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 9 shows one example in which device 16 is a tablet computer 600. In FIG. 9, computer 601 is shown with user interface display screen 602. Screen 602 can be a touch screen or a pen-enabled interface that receives inputs from a pen or stylus. Tablet computer 600 may also use an on-screen virtual keyboard. Of course, computer 601 might also be attached to a keyboard or other user input device through a suitable attachment mechanism, such as a wireless link or USB port, for instance. Computer 601 may also illustratively receive voice inputs as well.

FIG. 10 is similar to FIG. 9 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
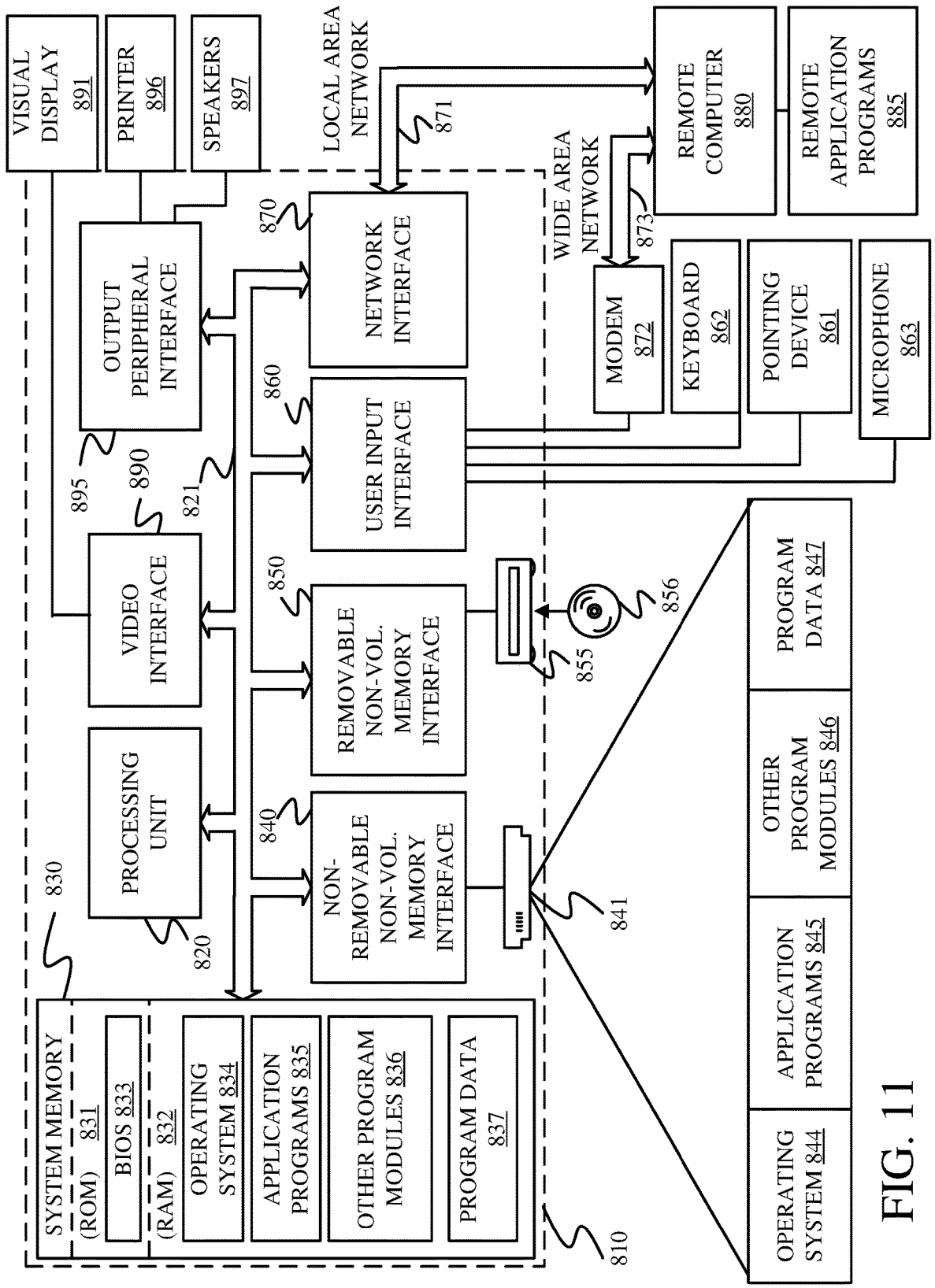
FIG. 11 is a block diagram showing one example of a computing environment that can be used in an agricultural harvester.

FIG. 11 is one example of a computing environment in which elements of FIG. 4 can be deployed. With reference to FIG. 11, an example system for implementing some embodiments includes a computing device in the form of a computer 810 programmed to operate as discussed above. Components of computer 810 may include, but are not limited to, a processing unit 820 (which can comprise processors or servers from previous figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 11.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a computer-implemented method of operating an agricultural work machine is provided. The method includes initiating row sensing guidance for the agricultural work machine to guide steering of the agricultural work machine based at least one signal from a row sensor; obtaining contextual information; determining whether a row is present based on the contextual information; and selectively ignoring the at least one signal from the row sensor based on whether a row is present.

Example 2 is the computer-implemented method of any or all of the previous examples, wherein the contextual information is obtained from a map based on a geographic position of the agricultural work machine.

Example 3 is the computer-implemented method of any or all of the previous examples, wherein the contextual information is obtained using wireless communication.

Example 4 is the computer-implemented method of any or all of the previous examples, wherein the map includes a specified boundary turning area.

Example 5 is the computer-implemented method of any or all of the previous examples, wherein the contextual information is obtained from user input indicative of a situational maneuver.

Example 6 is the computer-implemented method of any or all of the previous examples, and further comprising notifying the operator of a row-not-present state.

Example 7 is the computer-implemented method of any or all of the previous examples, and further comprising stopping the agricultural work machine based on a row-not-present state.

Example 8 is the computer-implemented method of any or all of the previous examples, wherein the agricultural work machine is a harvester.

Example 9 is an agricultural work machine. The agricultural work machine includes a set of ground engaging components and a steering system coupled to at least one ground engaging component and configured to control a direction of the agricultural work machine based on an input signal. A row sensor is mounted relative to the agricultural work machine and configured to provide a row sensor signal indicative of plants physically contacting the row sensor. A controller is coupled to the row sensor and the steering system, the controller being configured to generate the input signal to the steering system based on the row sensor signal. A context sensor is coupled to the controller and configured to provide context information to the controller and the controller is configured to selectively ignore the row sensor signal based on the context information.

Example 10 is the agricultural work machine of any or all of the previous examples, wherein the agricultural work machine includes a row crop harvesting head having a plurality of crop dividers.

Example 11 is the agricultural work machine of any or all of the previous examples, wherein the agricultural work machine has a plurality of row sensors, each row sensor having a pair of feelers.

Example 12 is the agricultural work machine of any or all of the previous examples, wherein the context sensor includes a map providing an indication of crop presence based on location and wherein the agricultural work machine further includes a position sensor coupled to the controller.

Example 13 is the agricultural work machine of any or all of the previous examples, wherein the map includes regions of non-crop plants.

Example 14 is the agricultural work machine of any or all of the previous examples, wherein the map is a planter-generated map.

Example 15 is the agricultural work machine of any or all of the previous examples, wherein the map provides field edges.

Example 16 is the agricultural work machine of any or all of the previous examples, wherein the map provides waterways.

Example 17 is the agricultural work machine of any or all of the previous examples, wherein the map is updated dynamically by the agricultural work machine.

Example 18 is the agricultural work machine of any or all of the previous examples, wherein the context sensor includes an optical sensor.

Example 19 is the agricultural work machine of any or all of the previous examples, wherein the context sensor includes an aerial image of a field in which the agricultural machine is located.

Example 20 is a control system for an agricultural work machine. The control system includes a steering control system configured to steer the agricultural work machine, a row sensor, a context sensor configured to provide context information, and a controller coupled to the steering control system, the row sensor, and the context sensor. The controller is configured to operably control the steering control system based on a signal from the row sensor during a row-present state and to transition to a row-not-present state based on the context information, wherein the controller ignores the signal from the row sensor during the row-not-present state.

Although the subject matter has been described in language specific to structural features or methodological acts, it is to be understood that the subject matter defined in the appended claims is not necessarily limited to the specific features or acts described above. Rather, the specific features and acts described above are disclosed as example forms of the claims.

What is claimed is:

1. A computer-implemented method of operating an agricultural work machine, the method comprising:

initiating row sensing guidance for the agricultural work machine to guide steering of the agricultural work machine through a field having a row crop based on at least one signal from a tactile-based row sensor that detects plants striking the tactile-based row sensor;

obtaining a prior map of the field, the prior map including mapped context information for one or more locations in the field;

determining a geographical position of the agricultural work machine during the row sensing guidance;

obtaining the mapped context information, from the prior map, based on the geographic position of the agricultural work machine; and selectively ignoring the at least one signal from the tactile-based row sensor based on the mapped context information and guiding steering of the agricultural work machine based on a different steering source than the row sensing guidance, wherein the different steering source comprises one or more operator steering inputs.

2. The computer-implemented method of claim 1, wherein the mapped context information is obtained using wireless communication.

3. The computer-implemented method of claim 1, and further comprising notifying an operator that the agricultural work machine has entered a non-planted area.

4. The computer-implemented method of claim 1, and further comprising selectively stopping the agricultural work machine based on the agricultural work machine entering a non-planted area.

5. The computer-implemented method of claim 1, wherein the agricultural work machine is a harvester.

6. The computer-implemented method of claim 1, and further comprising obtaining crop height context data from a crop height sensor, and selectively ignoring the at least one signal from the tactile-based row sensor based on the mapped context information and the crop height context data.

7. The computer-implemented method of claim 6, wherein the crop height sensor is an ultrasonic sensor.

8. The computer-implemented method of claim 1, wherein the prior map is based on one or more aerial images of the field.

9. The computer-implemented method of claim 1, wherein guiding steering of the agricultural work machine based on the different steering source comprises:
guiding steering of the agricultural work machine using a GPS-based guidance system.

10. The computer-implemented method of claim 1, wherein determining the geographical position comprises determining the geographical position using a global satellite navigation system.

11. The computer-implemented method of claim 10, and further comprising enhancing the geographical position using a real-time kinematic component.

12. The computer-implemented method of claim 1, wherein determining the geographical position comprises determining the geographical position using a dead reckoning system.

13. The computer-implemented method of claim 1, wherein determining the geographical position comprises determining the geographical position using cellular triangulation.

14. The computer-implemented method of claim 1, wherein the tactile-based row sensor is unable to discriminate between crop plants and non-crop plants.

15. A computer-implemented method of operating an agricultural work machine, the method comprising:
initiating row sensing guidance for the agricultural work machine to guide steering of the agricultural work machine through a field, having a row of crop, based on at least one signal from a tactile-based row sensor that detects plants striking the tactile-based row sensor;
determining a geographical position of the agricultural work machine within the row of crop during row sensing guidance;
obtaining contextual information from a map based on the geographic position of the agricultural work machine;
obtaining crop height context data from a crop height sensor; and
selectively ignoring the at least one signal from the tactile-based row sensor based on the contextual information and the crop height context data, and guiding steering of the agricultural work machine based on a different steering source than the row sensing guidance.

16. The computer-implemented method of claim 15, and further comprising:
determining that the agricultural work machine has entered a non-crop area, within the row of crop, based on the contextual information, wherein the non-crop area comprises at least one of a weedy area or a drainage area.

17. The computer-implemented method of claim 14, wherein selectively ignoring the at least one signal from the tactile-based row sensor comprises determining that the agricultural work machine has entered a non-crop area, within the row crop, based on the mapped context information and selectively ignoring the at least one signal from the tactile-based row sensor based on determining that the agricultural work machine has entered the non-crop area.

18. An agricultural work machine comprising:
one or more ground engaging traction elements; and
a control system configured to:
initiate row sensing guidance for the agricultural work machine to guide steering of the agricultural work machine through a field having a row crop based on at least one signal from a tactile-based row sensor that detects plants striking the tactile-based row sensor;
obtain crop height context data from a crop height sensor; and
selectively ignore the at least one signal from the tactile-based row sensor based on the crop height context data and control steering of the agricultural work machine using a different steering source, other than the row sensing guidance.

19. The agricultural work machine of claim 18, wherein the tactile-based row sensor is unable to discriminate between crop plants and non-crop plants, and the control system is configured to:
determine that the agricultural work machine has entered a non-crop area, within the row crop, based on the crop height context data; and
control steering of the agricultural work machine, using the different steering source, based on the determination that the agricultural work machine has entered the non-crop area.

* * * * *